United States Patent
Nordalm et al.

(10) Patent No.: US 11,052,798 B2
(45) Date of Patent: Jul. 6, 2021

(54) AIR SUPPLY DEVICE FOR A MOTOR VEHICLE SEAT AND METHOD FOR OPERATING THE AIR SUPPLY DEVICE

(71) Applicant: Bayerische Motoren Werke Aktiengesellschaft, Munich (DE)

(72) Inventors: Hendrik Nordalm, Munich (DE); Sebastian Geithner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 245 days.

(21) Appl. No.: 15/136,073

(22) Filed: Apr. 22, 2016

(65) Prior Publication Data

US 2016/0236599 A1    Aug. 18, 2016

Related U.S. Application Data

(63) Continuation of application No. PCT/EP2014/072438, filed on Oct. 20, 2014, now Pat. No. 10,539,376.

(30) Foreign Application Priority Data

Oct. 23, 2013  (DE) .................. 10 2013 221 516.9

(51) Int. Cl.
*B60N 2/56*  (2006.01)

(52) U.S. Cl.
CPC ......... *B60N 2/5671* (2013.01); *B60N 2/5621* (2013.01); *B60N 2/5685* (2013.01)

(58) Field of Classification Search
CPC ...... A61B 5/00; B60N 2/5621; B60N 2/5671; B60N 2/5685; B60N 2/56; B60N 2/5607;

(Continued)

(56) References Cited

U.S. PATENT DOCUMENTS 4,351,425 A * 9/1982 Bopp .................. F16D 35/026
                                                    123/41.12
4,416,324 A * 11/1983 Sutoh ................ B60H 1/00978
                                                    165/202

(Continued)

FOREIGN PATENT DOCUMENTS

CN          1158655 A      9/1997
CN        102951052 A      3/2013

(Continued)

OTHER PUBLICATIONS

Chinese Office Action issued in counterpart Chinese Application No. 201480058067.9 dated Feb. 28, 2017 with English translation (10 pages).

(Continued)

Primary Examiner — Angelina Shudy
(74) Attorney, Agent, or Firm — Crowell & Moring LLP

(57) ABSTRACT

An air supply device and a method of operating same are provided for a vehicle seat having an air discharge opening provided in the upper region of the vehicle seat, via which opening a head, shoulder, and neck region of the seat occupant can be supplied with an airflow. The airflow is adjustable by a control unit for controlling or regulating a fan rotational speed of a blower and can be heated via a heating element. The control unit is supplied at least one activation signal for activating the air supply device and a temperature signal that provides information about the interior temperature. The control unit activates the heating element and the blower according to the activation signal and then controls at least the blower as a function of the interior temperature.

4 Claims, 2 Drawing Sheets

(58) Field of Classification Search
CPC .. B60N 2/5628; B60N 2/5635; B60N 2/5642; B60N 2/565; B60N 2/5657; B60N 2/5678; B60N 2/5692; F24F 11/0079
USPC .................................................. 701/36, 49
See application file for complete search history.

(56) References Cited

U.S. PATENT DOCUMENTS

| | | | | |
|---|---|---|---|---|
| 4,938,033 A * | 7/1990 | Ogihara | B60H 1/00842 | 165/202 |
| 5,003,785 A * | 4/1991 | Petri | B60H 1/00878 | 236/91 E |
| 5,008,803 A * | 4/1991 | Iida | B60H 1/00828 | 165/247 |
| 5,082,173 A * | 1/1992 | Poehlman | F24F 11/0001 | 165/224 |
| 5,165,595 A * | 11/1992 | Horio | B60H 1/0075 | 236/49.3 |
| 5,259,814 A * | 11/1993 | Weissbrich | B60H 1/00807 | 236/49.3 |
| 5,524,439 A | 6/1996 | Gallup et al. | | |
| 5,626,021 A * | 5/1997 | Karunasiri | B60H 1/00285 | 236/49.3 |
| 5,873,256 A * | 2/1999 | Denniston | F24F 3/1423 | 62/91 |
| 5,974,350 A * | 10/1999 | Davis, Jr. | G06N 7/04 | 701/36 |
| 6,012,515 A * | 1/2000 | Stubbendorff | B64D 13/08 | 165/254 |
| 6,037,567 A * | 3/2000 | Inoue | B60H 1/2225 | 165/299 |
| 6,237,675 B1 * | 5/2001 | Oehring | B60H 1/00285 | 165/288 |
| 6,341,494 B1 * | 1/2002 | Isobe | B60H 1/3205 | 165/204 |
| 6,439,468 B1 * | 8/2002 | Lambert | B60H 1/00735 | 236/49.3 |
| 6,588,833 B2 * | 7/2003 | Strommer | B60H 1/00464 | 296/214 |
| 6,949,021 B2 * | 9/2005 | Ichishi | B60H 1/004 | 165/288 |
| 7,084,774 B2 * | 8/2006 | Martinez | B60H 1/00742 | 236/440 |
| 7,513,439 B2 * | 4/2009 | Eisenhour | B60H 1/0075 | 165/203 |
| 7,797,958 B2 * | 9/2010 | Alston | B60H 1/00428 | 62/236 |
| 8,540,166 B2 * | 9/2013 | Nemoto | B60H 1/00764 | 123/41.11 |
| 8,948,966 B2 * | 2/2015 | Kim | B60H 1/2218 | 701/36 |
| 9,092,030 B2 * | 7/2015 | Weiss | G05B 11/01 | |
| 9,623,722 B2 * | 4/2017 | Chagnon | B60H 1/00371 | |
| 9,758,015 B2 * | 9/2017 | Hoke | B60H 1/00742 | |
| 9,994,100 B1 * | 6/2018 | Del Gaizo | B60K 11/04 | |
| 10,106,063 B2 * | 10/2018 | Kim | B60N 2/5678 | |
| 10,589,593 B2 * | 3/2020 | Westendarp | B60H 1/00428 | |
| 10,705,582 B2 * | 7/2020 | Sato | H05K 7/20381 | |
| 10,773,570 B2 * | 9/2020 | Herbolzheimer | B60H 1/3213 | |
| 10,933,780 B2 * | 3/2021 | Rappl | B60H 1/246 | |
| 2001/0011200 A1 * | 8/2001 | Kobayashi | H05K 7/20209 | 701/36 |
| 2001/0022222 A1 | 9/2001 | Aoki et al. | | |
| 2001/0045278 A1 * | 11/2001 | Iwamoto | B60H 1/00407 | 165/202 |
| 2002/0105213 A1 * | 8/2002 | Rauh | B60H 1/00285 | 297/180.14 |
| 2003/0150229 A1 | 8/2003 | Aoki et al. | | |
| 2005/0238339 A1 * | 10/2005 | Bargheer | B60H 1/00407 | 392/379 |
| 2005/0241325 A1 * | 11/2005 | Olney | F24F 11/0079 | 62/178 |
| 2006/0037565 A1 * | 2/2006 | Coates | B01D 46/0036 | 123/41.49 |
| 2006/0144581 A1 * | 7/2006 | Kauf | B60H 1/00764 | 165/202 |
| 2006/0290175 A1 * | 12/2006 | Hartwich | B60H 1/00285 | 297/180.1 |
| 2007/0000659 A1 * | 1/2007 | Schlanger | B60H 1/00735 | 165/202 |
| 2008/0014852 A1 * | 1/2008 | Mielke | B60H 1/00642 | 454/75 |
| 2008/0020697 A1 * | 1/2008 | Heil | B60H 1/00407 | 454/136 |
| 2008/0073057 A1 * | 3/2008 | Kojima | B60H 1/00735 | 165/43 |
| 2008/0136221 A1 * | 6/2008 | Hartmann | B60H 1/00821 | 297/180.14 |
| 2008/0161998 A1 * | 7/2008 | Yokoi | G07C 5/0841 | 701/36 |
| 2008/0168766 A1 * | 7/2008 | Oomura | B60H 1/004 | 60/320 |
| 2008/0191520 A1 | 8/2008 | Hartmann et al. | | |
| 2008/0300749 A1 * | 12/2008 | Hartmann | B60N 2/5685 | 701/36 |
| 2009/0130966 A1 * | 5/2009 | Tucker | B60H 1/248 | 454/75 |
| 2009/0150024 A1 * | 6/2009 | Kojima | B60H 1/00642 | 701/36 |
| 2009/0192671 A1 * | 7/2009 | Bolender | B60H 1/2218 | 701/36 |
| 2010/0080399 A1 * | 4/2010 | Pfau | B60H 1/00764 | 381/71.4 |
| 2010/0089563 A1 * | 4/2010 | Sundhar | B60H 1/00428 | 165/202 |
| 2010/0120345 A1 * | 5/2010 | Ryan | B60H 1/00371 | 454/75 |
| 2011/0202234 A1 * | 8/2011 | Bradley | B60K 6/48 | 701/36 |
| 2012/0097465 A1 * | 4/2012 | Leffert | F01P 7/12 | 180/68.1 |
| 2012/0136535 A1 * | 5/2012 | Buford | B60L 58/33 | 701/36 |
| 2012/0224976 A1 * | 9/2012 | Nagamatsu | G06F 1/206 | 417/1 |
| 2012/0234815 A1 * | 9/2012 | Willey | B60N 2/5685 | 219/202 |
| 2012/0239251 A1 * | 9/2012 | Wijaya | B60H 1/3205 | 701/36 |
| 2012/0247746 A1 * | 10/2012 | Sakajo | B60H 1/00392 | 165/202 |
| 2012/0312520 A1 * | 12/2012 | Hoke | B60H 1/00285 | 165/203 |
| 2012/0324927 A1 * | 12/2012 | Suzuki | B60H 1/3211 | 62/126 |
| 2013/0043320 A1 | 2/2013 | Zhang et al. | | |
| 2013/0061619 A1 * | 3/2013 | Saitou | F24F 11/0012 | 62/89 |
| 2013/0066498 A1 * | 3/2013 | Nissato | B60W 10/26 | 701/22 |
| 2013/0122796 A1 * | 5/2013 | Lim | B60H 1/00278 | 454/75 |
| 2013/0127210 A1 * | 5/2013 | Jung | A47C 7/744 | 297/180.12 |
| 2013/0167556 A1 * | 7/2013 | Jun | F25B 21/04 | 62/3.61 |
| 2013/0206382 A1 * | 8/2013 | Ichishi | B60N 2/5628 | 165/203 |
| 2013/0232996 A1 * | 9/2013 | Goenka | B60N 2/56 | 62/3.61 |
| 2013/0332013 A1 * | 12/2013 | Malone | B60H 1/00764 | 701/22 |
| 2014/0032011 A1 * | 1/2014 | Artman | G05D 23/1931 | 700/300 |
| 2014/0110489 A1 * | 4/2014 | Yasui | F02N 11/0833 | 237/5 |
| 2014/0265976 A1 * | 9/2014 | Weiss | G05B 11/01 | 318/471 |

(56) References Cited

U.S. PATENT DOCUMENTS

| | | | |
|---|---|---|---|
| 2015/0028116 A1* | 1/2015 | Satzger | B60H 1/2218 237/5 |
| 2015/0028119 A1* | 1/2015 | Satzger | B60H 1/2215 237/28 |
| 2015/0158367 A1* | 6/2015 | Jeong | B60H 1/00878 701/36 |
| 2015/0231947 A1* | 8/2015 | Shmueli-Friedland | B60H 1/00742 165/202 |
| 2015/0285524 A1* | 10/2015 | Saunders | F24F 11/001 454/239 |
| 2016/0031348 A1* | 2/2016 | Kurosawa | B60N 2/5657 297/180.1 |
| 2016/0046173 A1* | 2/2016 | Horn | B60H 1/245 454/75 |
| 2016/0160429 A1* | 6/2016 | Vian | D06F 39/045 34/443 |
| 2016/0236599 A1* | 8/2016 | Nordalm | B60N 2/5685 |
| 2016/0237884 A1* | 8/2016 | Yamada | F02B 37/186 |
| 2016/0301119 A1* | 10/2016 | Izumi | H01M 10/48 |
| 2017/0096314 A1* | 4/2017 | Kakutani | B65H 37/00 |
| 2017/0176040 A1* | 6/2017 | Mercer | F24F 11/0079 |
| 2017/0203632 A1* | 7/2017 | Westendarp | B60H 1/00521 |
| 2017/0297412 A1* | 10/2017 | Bandara | B60H 1/00785 |
| 2017/0315599 A1* | 11/2017 | Marripudi | G06F 1/206 |
| 2018/0073791 A1* | 3/2018 | Sun | F25B 49/027 |
| 2018/0267582 A1* | 9/2018 | Woo | G05D 13/62 |
| 2019/0031060 A1* | 1/2019 | Rappl | B60H 1/00285 |
| 2019/0077274 A1* | 3/2019 | Moriya | B60W 20/17 |
| 2019/0143784 A1* | 5/2019 | Mazzocco | B60N 2/5678 165/203 |
| 2019/0168581 A1* | 6/2019 | Larson | B60H 1/00885 |
| 2019/0176568 A1* | 6/2019 | Ostrowski | B60H 1/0073 |
| 2019/0179384 A1* | 6/2019 | Sato | F24F 11/89 |
| 2019/0191592 A1* | 6/2019 | Liu | H05K 7/20209 |
| 2019/0191812 A1* | 6/2019 | Salem | H02S 40/38 |
| 2019/0360380 A1* | 11/2019 | Dudar | B60K 11/02 |
| 2020/0045845 A1* | 2/2020 | Wang | F04D 19/002 |
| 2020/0200425 A1* | 6/2020 | Xi | F24F 11/65 |
| 2020/0333030 A1* | 10/2020 | Magee | B65G 69/008 |

FOREIGN PATENT DOCUMENTS

| | | |
|---|---|---|
| CN | 103129431 A | 6/2013 |
| DE | 103 05 336 A1 | 8/2003 |
| DE | 10 2004 030 706 B3 | 9/2005 |
| DE | 10 2004 030 707 A1 | 1/2006 |
| DE | 10 2006 015 667 A1 | 10/2007 |
| EP | 1 778 521 B1 | 4/2008 |
| JP | 2011020478 A * | 2/2011 |

OTHER PUBLICATIONS

International/ Search Report (PCT/ISA/210) issued in PCT Application No. PCT/EP2014/072438 dated Jan. 7, 2015 with English translation (six pages).

German-language Written Opinion (PCT/ISA/237) issued in PCT Application No. PCT/EP2014/072438 dated Jan. 7, 2015 (seven pages).

German Search Report issued in counterpart German Application No. 10 2013 221 516.9 dated Mar. 25, 2014 with partial English translation (10 pages).

German-language European Office Action issued in European Application No. 14786212.2 dated Apr. 24, 2019 with English translation (nine (9) pages).

* cited by examiner

AIR SUPPLY DEVICE FOR A MOTOR VEHICLE SEAT AND METHOD FOR OPERATING THE AIR SUPPLY DEVICE

CROSS REFERENCE TO RELATED APPLICATIONS

This application is a continuation of PCT International Application No. PCT/EP2014/072438, filed Oct. 20, 2014, which claims priority under 35 U.S.C. § 119 from German Patent Application No. 10 2013 221 516.9, filed Oct. 23, 2013, the entire disclosures of which are herein expressly incorporated by reference.

BACKGROUND AND SUMMARY OF THE INVENTION

The invention relates to an air-supply device for a vehicle seat having an air-outflow opening which is provided in the upper region of the vehicle seat, and via which the head, shoulder and neck region of the seat occupant can be supplied with an air stream, as well as a method for operating a correspondingly configured air-supply device.

EP 1 778 521 B1 discloses an air-supply device for a vehicle seat having an air-outflow opening which is provided in the upper region of the vehicle seat, and via which the head, shoulder and neck region of the seat occupant can be supplied with an air stream. Here, the air stream can be adjusted by way of a control unit, by control or regulation of a speed of a fan, and can be heated via a heating element. The control unit is fed at least one switch-on signal, for switching on the air-supply device, and a temperature signal, which is emitted by a temperature sensor and gives information relating to the interior temperature. Even before the air-supply device is switched on here, preconditioning of the heating element is prompted as soon as the vehicle is unlocked and/or opened and, at the same time, the exterior temperature and/or interior temperature drops below a threshold value previously stored in a memory device.

Such an air-supply device, or corresponding operation of the air-supply device, does indeed result in the outflowing air being pleasantly temperature-controlled directly as the air-supply device is switched on; however, this is accompanied by the vehicle's electrical system being subjected to a not inconsiderable load and accordingly by a high level of energy consumption, even before the vehicle is started up.

It is an object of the invention, then, to provide an air-supply device for a vehicle seat, and a corresponding method for operating an air-supply device for a vehicle seat, by which the driver experiences pleasant temperature-controlled conditions around his head, shoulder and neck region in an energy-efficient manner when the air-supply device is switched on.

This and other objects are achieved by an air-supply device, and by a method for operating a correspondingly designed air-supply device, in accordance with embodiments of the invention. The method according to the invention, and the advantageous configurations thereof, can be realized by way of an implemented algorithm or of an appropriate subassembly arrangement in the control unit provided for this purpose.

The air-supply device for a vehicle seat has, as already known from the prior art, an air-outflow opening which is provided in the upper region of the vehicle seat, and via which the head, shoulder and neck region of the seat occupant can be supplied with an air stream. The air stream here can be adjusted by a control unit, by control or regulation of a speed of a fan, and can be heated via an activatable heating element.

The basic idea of the invention is for the air-supply device, or the heating element and the fan, to be activated in principle, from the point of view of energy efficiency, only when a switch-on signal for switching on the air-supply device is present. A switch-on signal is usually present when a vehicle occupant actuates an operating element provided for activating the air-supply device. As an alternative, it is also possible for a switch-on signal to be generated and transmitted to the control unit, or generated there, on account of automatic activation of the air-supply device, for example when the vehicle top is opened and possibly when a further condition is present.

In order to protect the vehicle seat occupant from an excessively cold air stream during the heating-up phase of the heating element of the air-supply device, it being possible for said excessively cold air stream to have an unpleasant feel in particular at low temperatures inside the vehicle, according to the invention the control unit is fed, in addition, a temperature signal, which gives information relating to the interior temperature. In response to the switch-on signal, the control unit switches on the heating element and the fan and activates at least the fan in dependence on the interior temperature.

It is advantageously possible for the control unit to be configured such that, in response to a switch-on signal, it causes the fan to be operated merely at a preset low minimum fan speed when the temperature signal indicates that the interior temperature is lower than a preset threshold temperature value. It is possible here for both the minimum fan speed and the threshold temperature value to be fixed or preset in a variable manner in dependence on preset parameter values and to be stored in a corresponding memory unit. If a constant value is assumed for the threshold temperature value, then for example a temperature of approximately 10° C. may be preset for this purpose. The minimum fan speed may be, for example, a value between 5% and 30% of the maximum fan speed.

If the control unit, when the air-supply device is switched on, causes the fan to be operated merely at the low minimum fan speed, on account of a low interior temperature, in an advantageous development, the control unit prompts an increase in the fan speed when the temperature signal indicates that the interior temperature is no longer lower than the preset threshold temperature value. As an alternative, the control unit (irrespective of the interior temperature) prompts an increase in the speed of the fan when the fan has already been operating at the minimum fan speed for more than a preset period of time.

In a particularly advantageous development, the two aforementioned alternative conditions are combined such that the control unit causes the fan operated at the minimum fan speed to be operated at a higher fan speed when the temperature signal indicates that the interior is no longer at a lower temperature than the preset threshold temperature value, but at the latest when the fan has been operating at the minimum fan speed for more than a preset period of time irrespective of the interior temperature. In other words, the fan speed is increased as soon as the first of the two conditions (threshold temperature value being exceeded or time having elapsed) has been fulfilled.

It is advantageously possible for the fan speed, when increased on account of the increased interior temperature or on account of the timer having run its course, to be increased to a uniformly preset desired speed which, in principle, is higher than the minimum speed. If the air-supply device can be operated at different power settings, for example in a manner analogous to a seat heater, then it is possible, if an increase in the fan speed has been prompted, for the fan to be operated at a power-setting fan speed dependent on the required power setting of the air-supply device. In a manner analogous to this, it is also possible for the threshold temperature value and/or the minimum fan speed to be preset in dependence on the required power setting of the air-supply unit.

In a manner corresponding to the fan speed being raised in the case of a temperature increase in the vehicle interior or in the case of the timer having run its course, the control unit causes the fan to be operated directly at a power-setting fan speed dependent on a required power setting of the air-supply device and greater than a preset minimum fan speed also for the case where right at the start, that is to say when the switch-on signal is present, the temperature signal indicates that the interior temperature is not lower than a preset threshold temperature value.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
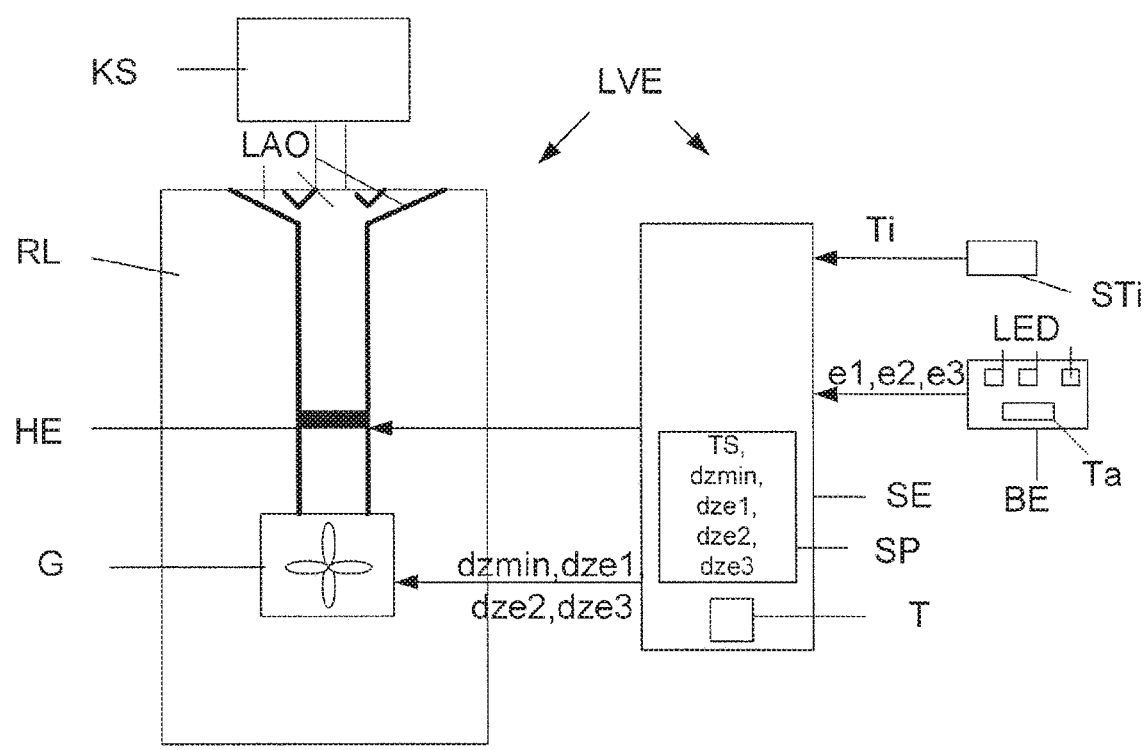
FIG. 1 is a very simplified block diagram illustration of a backrest of a vehicle seat together with the essential components of an air-supply device for the vehicle seat.

FIG. 1 shows a vastly simplified illustration of the backrest RL of a vehicle seat with a headrest KS arranged at the top. An air-outflow opening LAO is integrated in the backrest, in the upper region of the vehicle seat, as part of the air-supply device LVE for the vehicle seat. The head, shoulder and neck region of the seat occupant can be supplied with an air stream via the air-outflow opening. The air stream can be adjusted by way of a control unit SE, by control or regulation of a speed of a fan G, and can be heated via a heating element HE, which can likewise be activated by the control unit SE.

The control unit SE is fed at least the following signals: a switch-on signal e1, e2 or e3, for switching on the air-supply device LVE, and a temperature signal Ti from a temperature sensor STi. The temperature signal Ti from the sensor gives the control unit SE information relating to the interior temperature Ti. A switch-on signal e1, e2 or e3 is generated upon actuation of an operating element BE arranged in the vehicle, wherein the operating element has a button Ta and, upon actuation of the latter, a desired power setting can be selected, from a selection of three power settings of the air-supply device, by virtue of the button Ta being actuated one or more times. The light-emitting diodes LED illustrated in the operating element BE indicate to the user the power setting which he has selected. In accordance with the selected power setting, a switch-on signal e1, e2 or e3 is transmitted to the control unit SE.

Finally, the control unit SE also has a memory SP, in which are stored various values, e.g. a threshold temperature value TS or predefined desired fan speeds dzmin, dze1, dze2 and dze3 for the various activation scenarios. It is also the case that the control unit SE is configured such that, in response to a switch-on signal e1, e2 or e3, it switches on the heating element HE and the fan G, and activates at least the fan G in dependence on the interior temperature Ti fed, as a result of various fan speeds dzmin, dze1, dze2 and dze3 being preset.

The control unit SE further has a so-called timer T, which can be activated when the fan is activated at a minimum speed dzmin, and which is used for monitoring purposes for a certain period of time.

Figure 2:
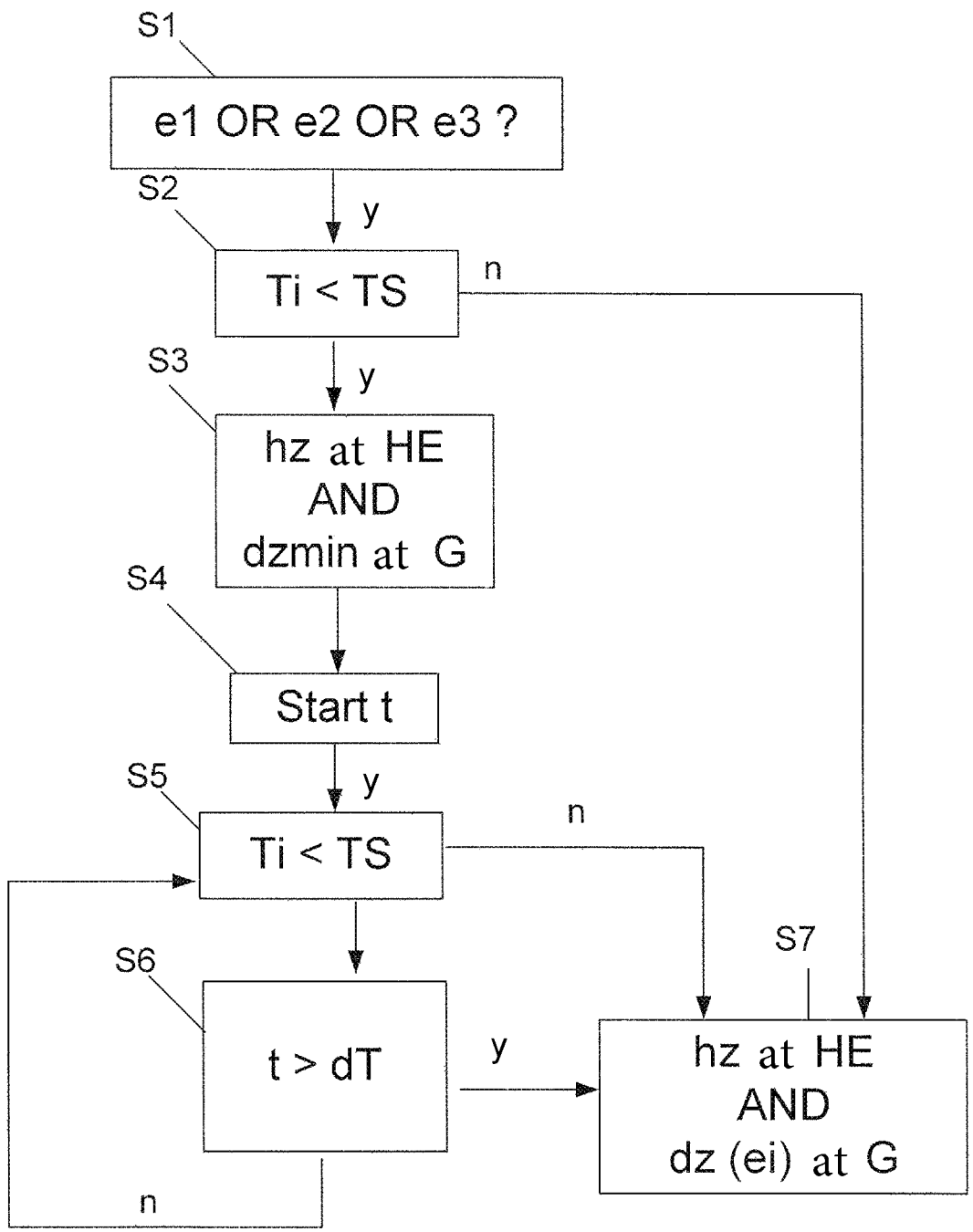
FIG. 2 is a simplified flow chart illustrating an exemplary method according to the invention for operating an air-supply device for a vehicle seat.

An advantageous exemplary method according to the invention for operating such an air-supply device will now be presented with reference to the following description relating to FIG. 2.

First of all, in step S1, a check is made in the control unit SE as to whether a switch-on signal e1, e2 or e3 for switching on the air-supply device LVE is present. As already explained above, the air-supply device can be operated in three power settings, wherein it is possible for the user to request, by corresponding actuation of the button Ta, a switch-on operation of the air-supply device LVE in one of the three power settings. In accordance with the power setting selected, a switch-on signal e1, e2 or e3 is transmitted to the control unit SE.

If a switch-on signal e1, e2 or e3 is present, a transfer is made to step S2 and it is determined there whether the temperature signal Ti indicates that the current interior temperature Ti is lower than a preset and stored threshold temperature value TS. If this is not the case, a transfer is made to step S7, where the control unit SE prompts: (i) a switch-on operation of the heating element HE, by virtue of a heating-activation signal hz being emitted, (ii) a switch-on operation of the fan G, and (iii) a control or regulation of the fan power such that the fan G is operated at a fan speed dz(ei) dependent on the required power setting ei (where i may have the value 1, 2 or 3). This setting is maintained until the user deactivates the air-supply device LVE again or selects a different power setting e1, e2, e3.

However, if it is established in step S2 that the current interior temperature Ti is lower than a preset and stored threshold temperature value TS, a transfer is made to step S3. There, the control unit SE prompts: (i) a switch-on operation of the heating element HE, by virtue of a heating-activation signal hz being emitted, (ii) a switch-on operation of the fan G, and (iii) a control or regulation of the fan power such that the fan G is operated at a preset and stored minimum fan speed dzmin. This minimum fan speed dzmin here is considerably lower than the above described fan speed dz(ei) dependent on the required power setting ei.

Then, in the next step S4, a timer T for time-measuring purposes is started, as a result of which it is possible to determine the period of time elapsed since the beginning of fan activation at the minimum fan speed. Then, in step S5, a check is made anew as to whether the current interior temperature Ti is still lower than the preset and stored threshold temperature value TS. If a temperature increase above the preset threshold temperature value has taken place, then, in a manner analogous to step S2, a transfer is made to step S7, where the control unit SE prompts a switch-on operation of the heating element HE, by virtue of a heating-activation signal hz being emitted, a switch-on operation of the fan G and control or regulation of the fan power such that the fan G is operated at a at a fan speed dz(ei) dependent on the required power setting ei (where i may have the value 1, 2 or 3).

However, if it is established in step S5 that the current interior temperature Ti is still lower than the preset and stored threshold temperature value TS, a check is then made, in step S6, as to whether the period of time t elapsed since the timer T began is greater than a preset period of time dT. If this is the case, a transfer is also made from step S5 to step S7 and—as already described above—activation and control or regulation of the heating element HE and of the fan is prompted. If the period of time t elapsed since the timer T began is not greater than the preset period of time dT, a return is made to step S5. It is thus possible to ensure that the control unit SE prompts an increase in the power of the fan G to a fan speed dz(ei) dependent on the required power setting ei, in principle, when the interior temperature Ti is greater than the preset threshold temperature value TS, but at the latest when the period of time t elapsed since the timer T began is greater than the preset period of time dT.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-supply device for a vehicle seat having an air-outflow opening provided in an upper region of the vehicle seat via which a head, shoulder and neck region of a seat occupant is suppliable with an air stream, the air-supply device comprising:
    a fan controllable to adjust the air stream;
    a heater configured to heat the air stream;
    a controller operatively configured to control a speed of the fan and the heater in accordance with a switch-on signal of the air-supply device received by the controller based on detecting a top of the vehicle is opened, wherein
        the controller receives a temperature signal indicating an interior temperature of the vehicle, and
        in response to the switch-on signal received by the controller and while the top of the vehicle is open, the controller:
        switches on the heater;
        activates the fan differently depending on comparison between the interior temperature of the vehicle and a preset threshold temperature value, wherein
            when the interior temperature of the vehicle is lower than the preset threshold temperature value, the controller, in response to the switch-on signal of the air-supply device, causes the fan to be operated at a preset minimum fan speed which is a non-zero speed; and
        causes the fan to be operated at a fan speed higher than the preset minimum fan speed at the earlier of:
            when the temperature signal indicates that the interior temperature is above the preset threshold temperature value, and
            when the fan has been operating at the preset minimum fan speed irrespective of the temperature signal for more than a preset period of time.

2. The air-supply device according to claim 1, wherein the fan speed higher than the preset minimum fan speed is a defined power-setting fan speed.

3. The air-supply device according to claim 1, further wherein the controller, in response to the switch-on signal, causes the fan to be operated directly at the defined power-setting fan speed dependent on a required power setting of the air-supply device and greater than the preset minimum fan speed when the temperature signal indicates that the interior temperature is above the present threshold temperature value.

4. The air-supply device according to claim 1, wherein the controller automatically, without user intervention activates the air-supply device based on the switch-on signal in response to the detection that the top of the vehicle is opened.

* * * * *